(No Model.) 2 Sheets—Sheet 1.
F. FRAZEE & J. L. WINTERSTEEN.
ONE WHEEL VEHICLE.
No. 486,456. Patented Nov. 22, 1892.
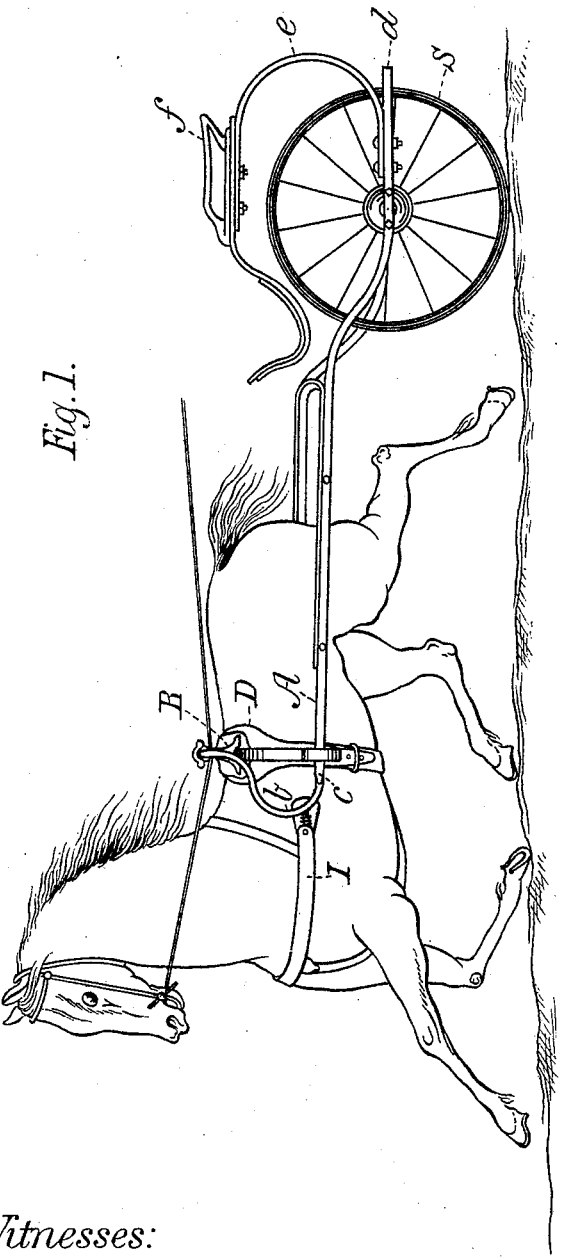
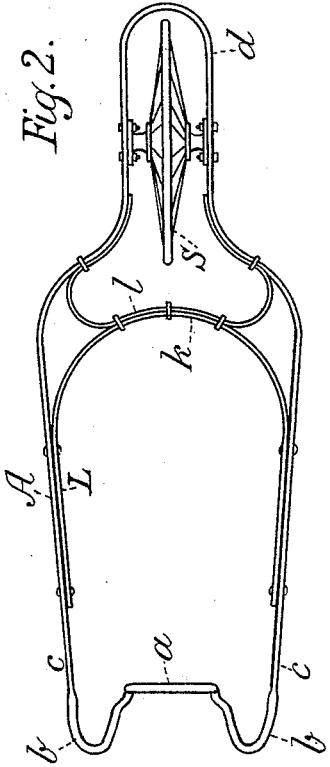
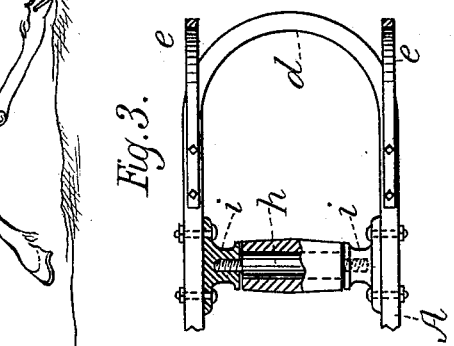
Witnesses:
Fred Arto's
Joseph Valle
Inventors:
Fremont Frazee
Jacob L. Wintersteen

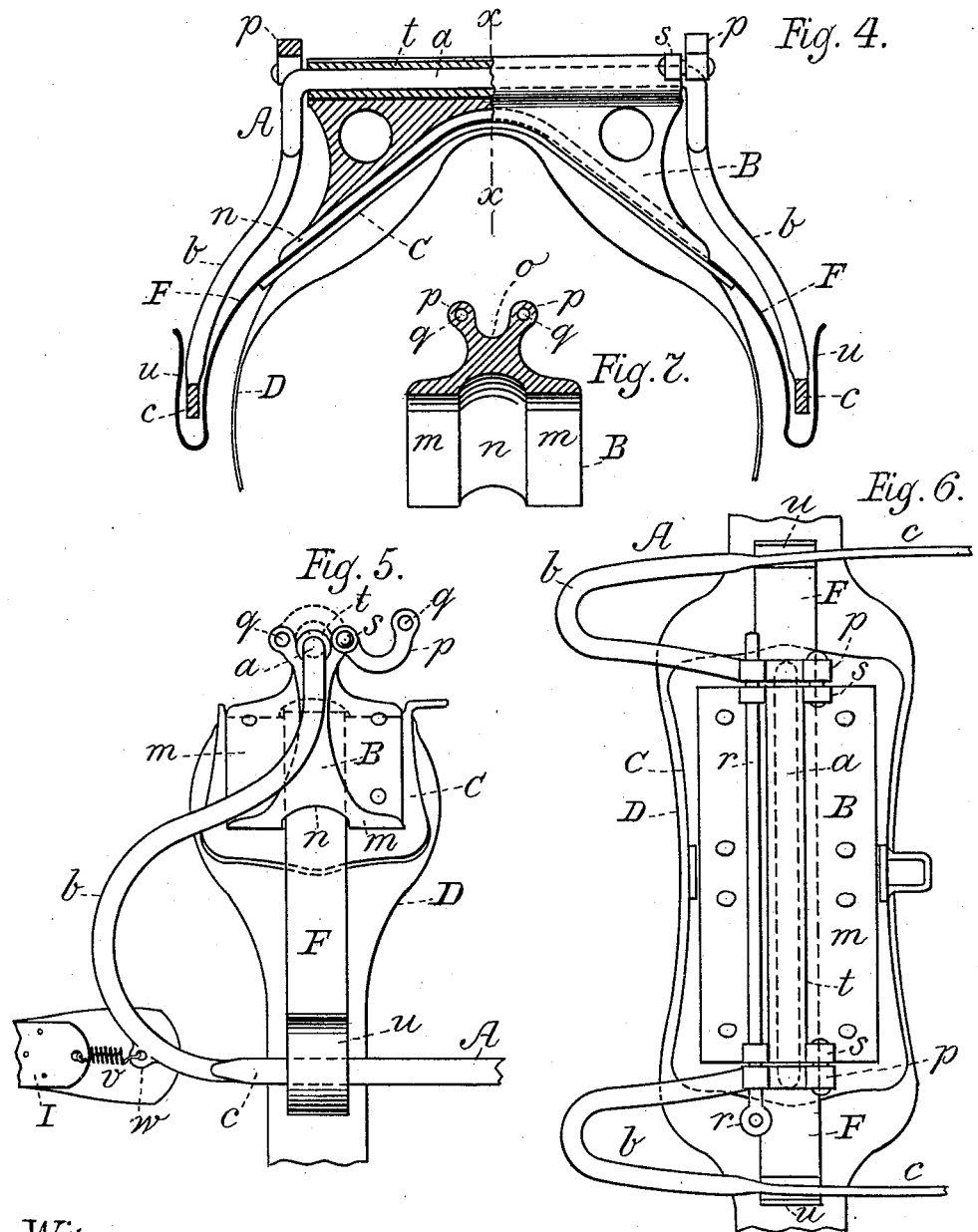

UNITED STATES PATENT OFFICE.

FREMONT FRAZEE AND JACOB L. WINTERSTEEN, OF CHICAGO, ILLINOIS.

ONE-WHEEL VEHICLE.

SPECIFICATION forming part of Letters Patent No. 486,456, dated November 22, 1892.

Application filed August 16, 1892. Serial No. 433,340. (No model.)

*To all whom it may concern:*

Be it known that we, FREMONT FRAZEE and JACOB L. WINTERSTEEN, citizens of the United States of America, residing at Chicago, in the county of Cook, State of Illinois, have jointly invented a new and useful Improvement in One-Wheeled Vehicles, of which the following is a description, reference being had to the accompanying drawings, the same forming part of this specification.

Our invention relates to a vehicle with one wheel connected to an endless shaft mounted upon a bracket, the same in combination with the harness of the horse; and it consists, chiefly, in the construction and arrangement of the several parts.

Referring to the drawings, Figure 1 represents a general view of the vehicle attached to a horse. Fig. 2 is a top view of the shaft and wheel. Fig. 3 shows in detail the mode of fastening the wheel-hub to the shaft. Fig. 4 is an enlarged front view, partially in section, of the bracket in connection with the front part of the shaft. Fig. 5 represents the foregoing in side view. Fig. 6 shows a top view of the same, and Fig. 7 is a sectional end view of the bracket on line $x\ x$ of Fig. 4.

The shaft A of the one-wheeled vehicle is an endless one made in one piece of a steel tube, which is selected for the purpose on account of lightness, compared with strength and elasticity of the material. The top portion $a$ of the tubular forward or front part of the shaft is detachably connected with a grooved bracket B, which is fastened to the saddle-tree C, and the latter is secured to the saddle-girth D in the usual manner. Said top portion $a$ of the shaft is a transverse straight-running part of corresponding length with the bracket, bended down endwise closely to the same and continuing in graceful equally-shaped semicircular curves $b\ b$, which terminate into diverging and gradually-flattened endless side portions $c\ c$ of the shaft, which near the rear part of the same are bended down and upward to a level position, furnishing a support $d$ for the spindle or axle of the vehicle-wheel S. Said level rear part of the shaft is mounted with a pair of so-called "C-springs" $e\ e$ to bear the driver's seat $f$, placed in line of center with the vehicle-wheel, which latter revolves around a fixed spindle $h$, with screw-threaded ends to connect with brackets $i\ i$, fastened on the inner side and opposite each to the other on the said wheel-supporting part of the shaft. The same is strengthened by a connected brace-bar L, having an outwardly round bended rear portion $k$, which is in combination with a counter-bended smaller side brace $l$, the ends of which are secured to the rear part of the shaft to keep the brace-bar L in firm position.

The front part $a$ of the shaft is attached to the horse by means of a bracket B, which is rigidly fastened to the harness and is made of suitable metal ornamental in design and provided with a lengthwise V-shaped flanged base $m$ to fit the shape of the saddle-tree C underneath. The said base $m$ is further provided with a longitudinally-running furrow $n$ at its under side to cover a metallic strip F, fastened to the saddle-tree, and a semicircular-shaped groove $o$ on the top part of the bracket in parallel direction of the said furrow for the reception of the front part $a$ of the shaft, and to secure the same in its position when connected with the bracket the grooved top part of the same is provided on both ends with a movable fastening device consisting of sufficient strong and curved arms $p\ p$, riveted to projecting lugs $s\ s$ on one side of the top part of the bracket and locked on the other side of the same by a removable pin $r$, which passes along through corresponding holes on the lugs $q\ q$, as shown in the drawings, which arrangement is for the purpose to permit a lengthwise oscillatory motion of the shaft when the vehicle runs a grade, and to prevent thereby friction the front part $a$ of the shaft is incased in a leather tube $t$, in size to fit into the groove $o$ of the bracket.

The before-mentioned metallic strip F between the flanged part of the bracket and the saddle-tree projects in curved shape down on both sides of the latter nearly parallel with the saddle-girth D at a space from the same and terminates with hook-shaped ends $u\ u$, surrounding the flattened side portions $c\ c$ of the shaft A in position to prevent vibratory motion of the same, supported thereby partially by the fixed spindle $h$ of the vehicle-wheel and the brace-bar L of the shaft.

The curved parts $b\ b$ of the front portion of the shaft are provided each with a lug $w$, the same having a hole in center, into which a spring-hook $v$ at the ends of the breast-strap I of the horse is fastened in order to unharness quickly, and by unlocking the front part $a$ of the shaft from the bracket B the shaft is lifted up and the horse is disengaged from the vehicle.

Having thus described our invention, we claim—

1. In a one-wheel vehicle drawn by a horse, the construction of an endless shaft A, bended in front to form the top part $a$, with extending curved portion $b$ $b$, the same provided with lugs $w$ and terminating into side portions $c$ $c$, the same in combination with a brace-bar L, connected with side brace $l$, said shaft bearing at the rear part $d$ of the same brackets $i$ $i$, spindle $h$ in connection with the vehicle-wheel, and springs $e$ $e$, substantially as shown, and for the purpose specified.

2. In a one-wheel vehicle having an endless shaft bended in front to form a raising top portion $a$, the same detachably connected with a metallic bracket B, combined with the saddle-tree C, the same connected with the saddle-girth D of the horse, said bracket B having a flanged base $m$, with a furrow $n$, and its top portion provided with a groove $o$, lugs $s$ $s$ and $q$ $q$, the same in connection with movable arms $p$ $p$ and detachable pin $r$, substantially as shown, and for the purpose described.

3. In a one-wheel vehicle having an endless shaft A, in combination with a metallic bracket B on the saddle-tree C, the same in connection with a metallic strip F underneath the furrowed base of the bracket, said strip terminating with hook-shaped ends $u$ $u$, substantially as shown, and for the purpose set forth.

In testimony whereof we have set hereunto our signatures in the presence of two subscribing witnesses.

FREMONT FRAZEE.
JACOB L. WINTERSTEEN.

Attest:
FRED. ARTOS,
JOSEPH VALLE.